(12) United States Patent
Slabaugh et al.

(10) Patent No.: US 7,400,767 B2
(45) Date of Patent: Jul. 15, 2008

(54) SYSTEM AND METHOD FOR GRAPH CUTS IMAGE SEGMENTATION USING A SHAPE PRIOR

(75) Inventors: Gregory G. Slabaugh, Princeton, NJ (US); Gozde Unal, West Windsor, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 22 days.

(21) Appl. No.: 11/456,947

(22) Filed: Jul. 12, 2006

(65) Prior Publication Data

US 2007/0014473 A1    Jan. 18, 2007

Related U.S. Application Data

(60) Provisional application No. 60/699,639, filed on Jul. 15, 2005.

(51) Int. Cl.
    *G06K 9/34* (2006.01)
(52) U.S. Cl. .................................. 382/173; 382/203
(58) Field of Classification Search ................ 382/128, 382/203, 173; 356/138; 359/455
    See application file for complete search history.

(56) References Cited

U.S. PATENT DOCUMENTS

| | | | |
|---|---|---|---|
| 6,961,454 B2 | 11/2005 | Jolly | 382/131 |
| 6,973,212 B2 * | 12/2005 | Boykov et al. | 382/173 |
| 7,016,111 B2 * | 3/2006 | Chubachi et al. | 359/455 |
| 7,079,674 B2 * | 7/2006 | Paragios et al. | 382/128 |
| 7,088,440 B2 * | 8/2006 | Buermann et al. | 356/138 |
| 2003/0053667 A1 | 3/2003 | Paragios et al. | 382/128 |
| 2005/0238215 A1 | 10/2005 | Jolly et al. | 382/128 |
| 2005/0271273 A1 | 12/2005 | Blake et al. | 382/173 |

OTHER PUBLICATIONS

Y. Boykov, et al., "Interactive Graph Cuts for Optimal Boundary and Region Segmentation of Objects In N D Images," in: Int'l Conf. on Comp. Vision, vol. 1, pp. 105-112, 2001.
N. Xu, et al., "Object Segmentation Using Graph Cuts Based Active Contours," in: CVPR, pp. 46-53, 2003.
D. Freedman, et al., "Interactive Cut Based Segmentation with Shape Priors," in: Proc. Computer Vision and Pattern Recognition, vol. 1, pp. 755-762, 2005.
G. Slabaugh, et al., "Graph Cuts Segmentation Using Elliptical Shape Priors," in: IEEE Int'l Conference on Image Processing, 2005.
M. Leventon, "Statistical Models in Medical Image Analysis," Ph.D. Thesis, Massachusetts Institute of Technology, Cambridge, Massachusetts, (2000).

* cited by examiner

*Primary Examiner*—Anh Hong Do

(57) ABSTRACT

A system and method for graph cut image segmentation using a shape prior is provided. In this method, an initial shape is applied to a portion of an image to be segmented. A narrowband is formed around a border of the shape, and a minimized graph cut is calculated for a portion of the image within the narrowband. The shape is then adjusted using the shape prior to fit the minimized graph cut. This method can be iteratively performed so that the shape evolves to segment an object from an image. The shape prior can be a parametric shape, such as an ellipse, or a statistical shape eigenspace calculated based on one or more training shapes.

31 Claims, 7 Drawing Sheets

SYSTEM AND METHOD FOR GRAPH CUTS IMAGE SEGMENTATION USING A SHAPE PRIOR

This application claims the benefit of U.S. Provisional Application No. 60/699,639, filed Jul. 15, 2005, the disclosure of which is herein incorporated by reference.

BACKGROUND OF THE INVENTION

The present invention relates to image segmentation, and more particularly, to graph out image segmentation using a shape prior.

Image segmentation is used to distinguish and partition an object or region (foreground) of a digital image from the background of the digital image. Image segmentation is commonly used, for example, in medical image analysis. Another popular use for image segmentation is in digital photograph editing.

Segmentation is a fundamental task in image processing and numerous methods have been developed to attempt to accurately segment an image. Some image segmentation methods rely on energy minimization in order to partition an image into multiple regions. Such methods include active contour image segmentation methods and graph cut image segmentation methods.

In an active contour method, the energy is typically comprised of image terms, which are regional and/or boundary based, as well as intrinsic regularization terms. An initial contour, or closed curve, is formed on the image, and based on energy minimization, the initial contour iteratively deforms to move to the region or object of interest. Active contour methods, however, can be sensitive to the initialization of the contour, since the energy minimization is subject to local minima. Active contour methods can also be subject to "leaking", which occurs when due to noise, clutter, poor contrast, etc., the image data does not provide enough information to stop the contour at the desired location.

In a graph cut image segmentation method, an energy minimization is performed on a graph. The graph is typically generated using vertices representing pixels of the image, as well as edges connecting the vertices, often using 4 or 8 neighborhood connectivity. It is also possible that the vertices of the graph could represent the connectivity of pixels in the image, while the edges of the graph represent the edges of the image. The energy in a graph cut image segmentation typically includes a region term that assigns penalties based on labeling a pixel as foreground or background, as well as a boundary term that assigns a penalty based on the dissimilarity of adjacent pixels. Edges connecting the pixels are cut so that each pixel is associated with either the foreground or the background of the image. The energy function to be minimized is typically the summation of weights of the edges that are cut. Conventional graph cut methods are not iterative, and typically achieve global minimization for an energy function. However, in conventional graph cut image segmentation methods, "leaking" can occur when an object has a weak boundary condition or is grouped together with another object having a similar intensity.

BRIEF SUMMARY OF THE INVENTION

The present invention overcomes the foregoing and other problems encountered in the known teachings by providing a system and method for graph cut image segmentation using a shape prior. A shape prior is a shape constraint applied to the image segmentation method to segment from an image a particular shaped object representable by a known class of shapes.

In one embodiment of the present invention, an initial shape is applied to a portion of an image to be segmented. A narrowband is then formed around a border of the shape, and a minimized graph cut is calculated for a portion of the image within the narrowband. The shape is then adjusted by fitting a result of the minimized graph cut using a shape prior. The steps of forming the narrow band, calculating the minimized graph cut, and adjusting the shape can be iteratively performed, with each iteration using the adjusted shape from the previous iteration. The shape prior can be a parametric shape, such as an ellipse, or a statistical shape eigenspace calculated based on one or more training shapes.

The initial shape can be applied to the image by selecting a seed point on the image and forming the initial shape at the seed point. The seed point can be selected automatically by a computer or manually by a user. In the case of the shape prior being a statistical shape eigenspace, a mean shape of the statistical shape eigenspace can be used as the initial shape.

In order to calculate the minimized graph cut, a shape mask can be generated based on the shape, and the mean intensities of pixels inside and outside of the shape can be calculated. An energy function based on the shape mask and the mean intensities is calculated, and the graph cut that minimizes the energy function is determined.

These and other advantages of the invention will be apparent to those of ordinary skill in the art by reference to the following detailed description and the accompanying drawings.

DETAILED DESCRIPTION OF EXEMPLARY EMBODIMENTS

Figure 1A:
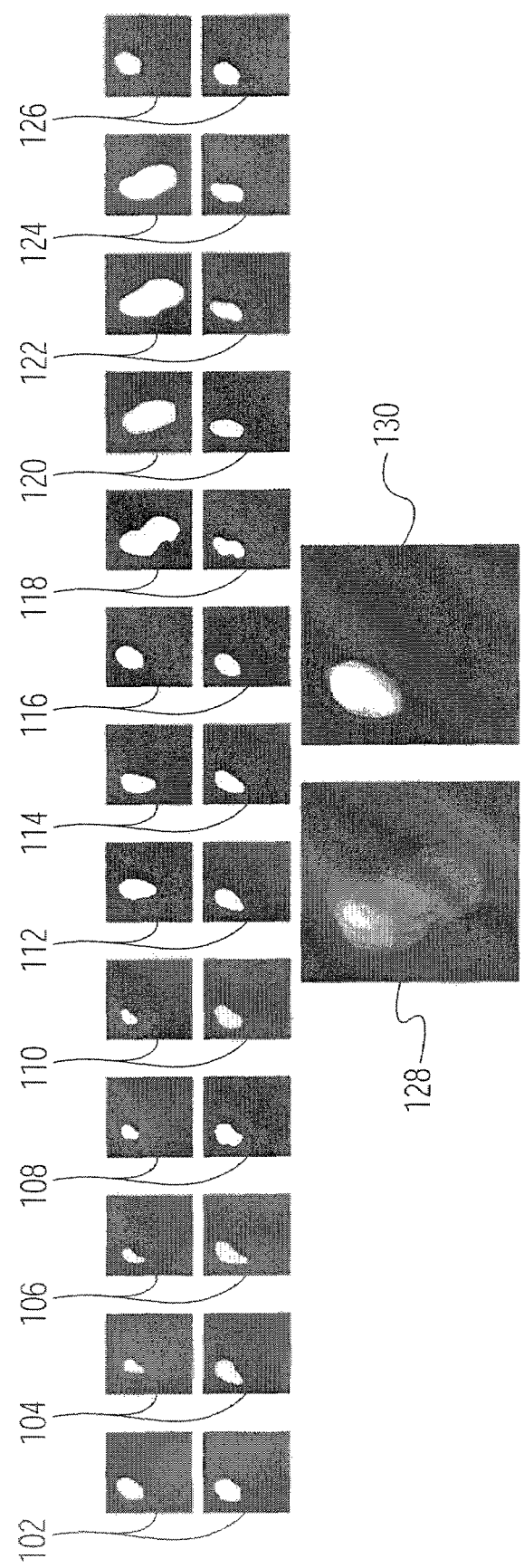
FIG. 1A illustrates a set of training shapes of fetal brain ventricles.

According to an embodiment of the present invention, a graph cut image segmentation method using a shape prior is used to segment an image. A shape prior is a shape constraint applied to an image segmentation method to force a segmented object or region of an image into a particular shape. According to embodiments of the present invention, the shape prior used with the graph cut image segmentation method may be a parametric shape prior or a statistical shape prior.

In order to segment an object having a shape having a known mathematical representation from an image, a parametric shape prior can be used. A parametric shape prior uses a known parametric shape to constrain the image segmentation. For example, an elliptical shape constraint can be used to model a multitude of objects, including a wide variety of anatomical structures, such as blood vessels and lymph nodes. For example, the segmentation of lymph nodes is an important application in the staging of lymphatic cancer. Furthermore, the ellipse has a simple parametric equation that can be applied to a graph cut image segmentation method. Other parametric shapes can include, but are not limited to, triangles, squares, rectangles, general n-gons (polygons), circles, ellipses, superellipses, etc. in 2 dimensions, and spheres, spheroids, cubes, cones, cylinders, parapellipeds, general polygonal meshes, etc. in three dimensions. Although an elliptical shape constraint is described herein, the present invention is not limited thereto, and any other parametric shape can be used similarly to constrain the graph cut image segmentation.

In order to segment an object that does not have a known or simple mathematical representation from an image, a statistical shape prior (shape eigenspace) can be used. A statistical shape prior is a formed from a set of training shapes similar to the shape of the object to be segmented. A statistical shape prior compactly represents variation of a given set of training shapes by forming a shape eigenspace from the training shapes. In forming a statistical shape prior from training shapes, the $i^{th}$ aligned training shape, 1 . . . , N, can be represented as the zero level set of a signed distance function, $\Psi_i$, which is negative inside the shape and positive outside the shape. Given this set of training data, $\{\Psi_i, \ldots, \Psi_N\}$, the mean shape can be computed as $$\Phi = \frac{1}{N} \sum_i \Psi_i.$$

Then, the shape variability about the mean can be determined by subtracting the mean shape from each training shape, resulting in N mean-offset functions $\{\Psi_1, \ldots, \Psi_N\} = \{\Psi_1 - \Phi_1, \ldots \Psi_N - \Phi\}$.

While the mean-offset functions capture the shape variation in the set of training shapes, the mean-offset functions are highly redundant. To represent this shape variation more compactly, principal components analysis (PCA) can be performed on the mean-offset functions to determine principal modes of variation. First, each column of an $N_1$ by $N_2$ mean-offset function $\Psi_i$ is stacked into a large column vector $\psi_i$. Then, a shape variability matrix S can be formed as $S=[\psi_1 \cdot \cdot \cdot \psi_N]$, which has a size M by N, with $M=N_1N_2$.

Although, a singular value decomposition (SVD) can be performed on the covariance matrix $$\frac{1}{N} SS^T,$$

for typical images this M by M matrix is very large, so SVD becomes computationally expensive. Fortunately, it is possible to perform SVD on a much smaller matrix $$\frac{1}{N} S^T S,$$

which has size N by N. Computing this SVD $$U \sum U^T = \frac{1}{N} S^T S$$

results in N eigenvalues and eigenvectors. If d is an eigenvector of $$\frac{1}{N} SS^T$$

with eigenvector $\lambda$, the Sd is an eigenvector of $$\frac{1}{N} S^T S$$

with eigenvector $\lambda$. Often, the majority of the variation in the mean-offset images is captured in just a few modes. Therefore, the k most significant modes are used in the representation.

Different shapes in the shape eigenspace can be represented as:

$$\Phi(w) = \bar{\Phi} + \sum_{i=1}^{k} \omega_i \Phi_i, \quad (1)$$

where $\omega_i$ is a weight on the $i^{th}$ mode $\Phi_i$. Likewise, if a new aligned shape is given, it is possible to computer its signed distance function $\Psi$ and project it into the shape eigenspace by finding the weights as:

$$w = U_k^T (\Psi - \bar{\Phi}), \quad (2)$$

where $U_k$ is a matrix comprising the first k eigenvectors of U. The projected shape can then be extracted from the zero level set of $\Phi(w)$ using Equation 1.

Figure 1B:
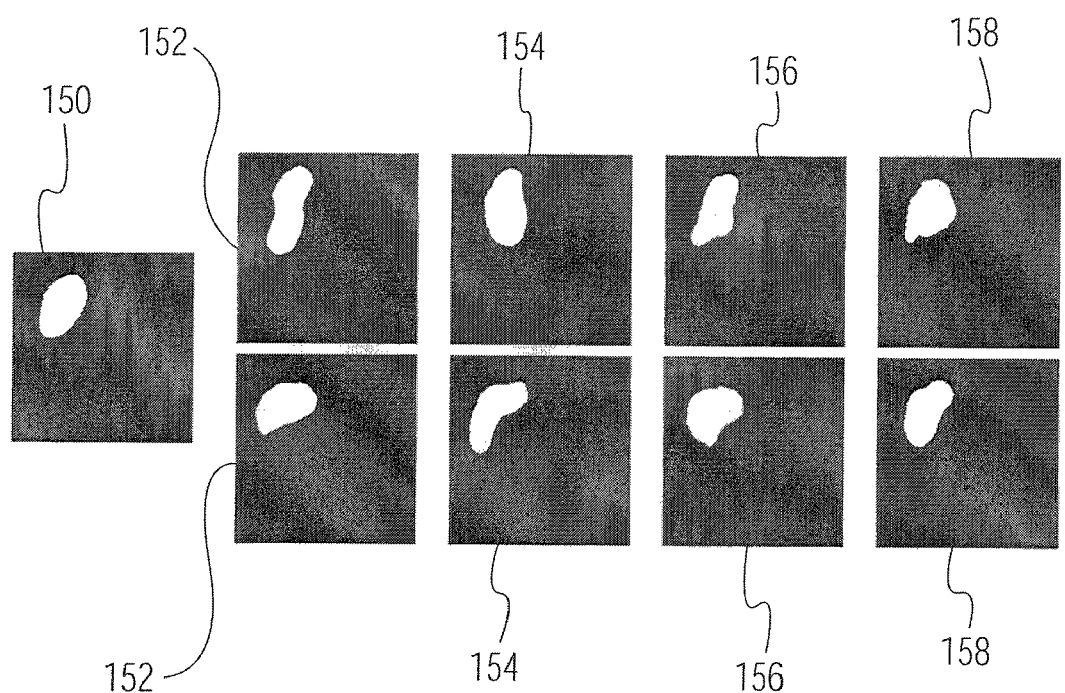
FIG. 1B illustrates a shape eigenspace calculated from the set of training shapes in FIG. 1A.

FIG. 1A illustrates an exemplary set of training shapes 102-126 for generating a shape eigenspace. The training shapes 102-126 in FIG. 1A are 13 binarized images of fetal brain ventricles that were manually extracted from ultrasound images. The training shapes 102-126 are aligned and then registered to a common reference frame. The top row shows the images 102-126 before registration, and the second row shows the images 102-126 after registration. These registered images can be used to calculate a shape eigenspace as described above. Image 128 is the sum of the images 102-126 before registration and image 130 is the sum of the images 102-126 after registration. As illustrated in FIG. 1A, image 128 is blurry, as the training shapes 102-126 are not aligned However, after registration, image 130 is much sharper and coherent, demonstrating that the registration aligns the training shapes 102-126. FIG. 1B illustrates the shape eigenspace calculated for the set of training shapes 102-134 of FIG. 1A.

Figure 2A:
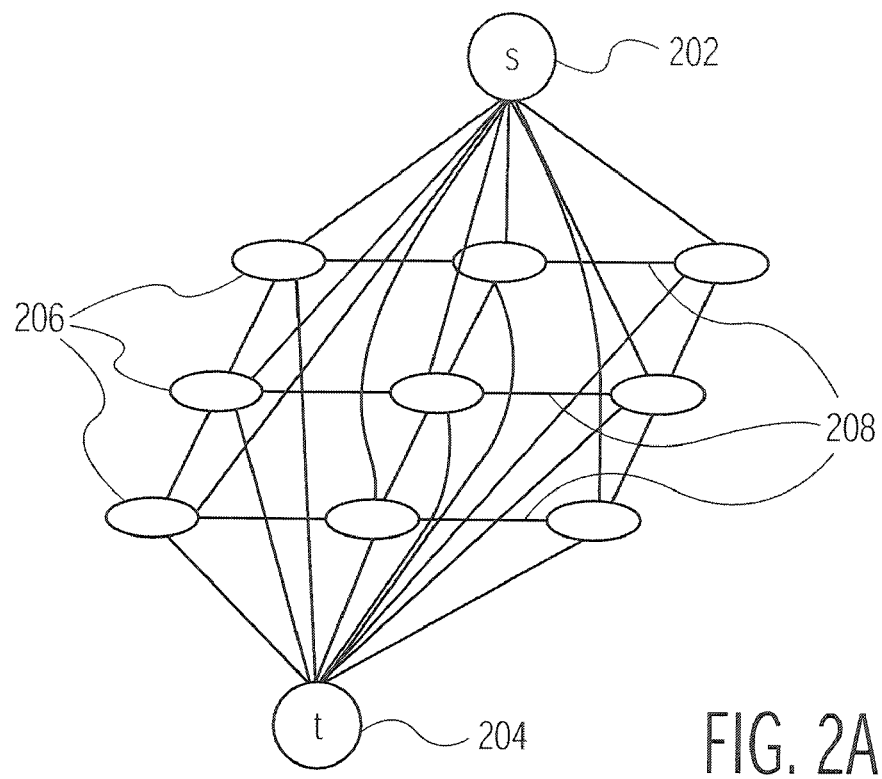
FIGS. 2A and 2B illustrate an exemplary graph for use in graph cut segmentation.
Figure 2B:
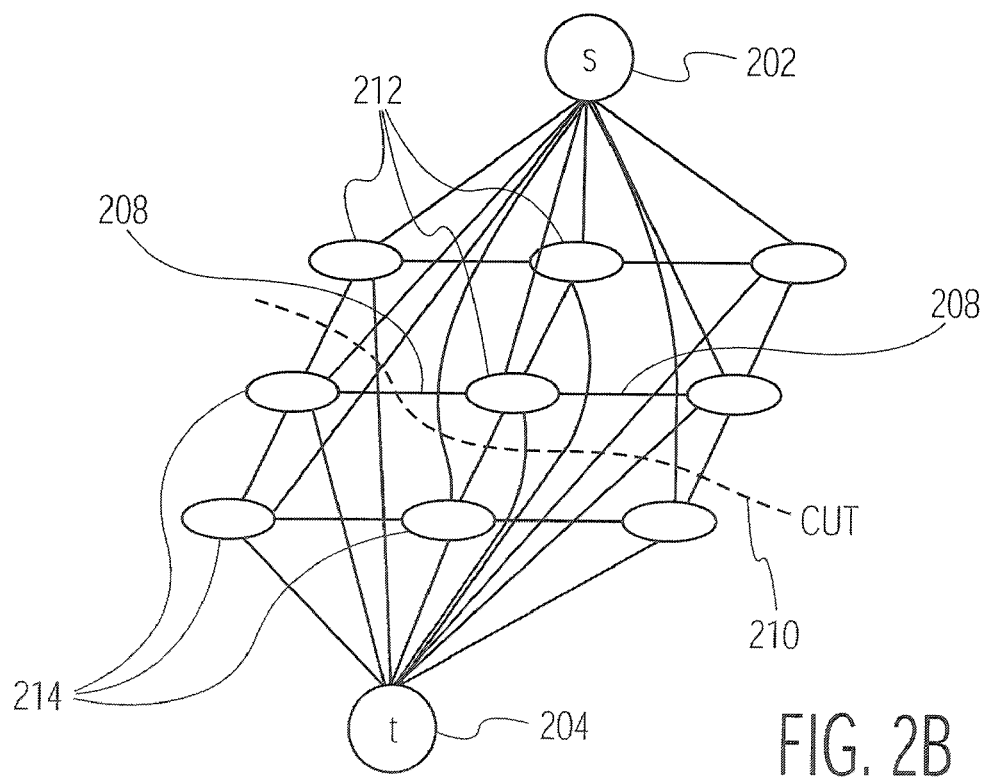

A mean shape 150 and the first four modes 152, 154, 156, and 158 are shown in FIG. 2B. Variation about the mean shape 150 is shown for each mode 152, 154, 156, and 158, such that the upper image represents $\overline{\Phi}-0.5\Phi_i$ and the lower image represents $\overline{\Phi}+0.5\Phi_i$. These four modes 152, 154, 156, and 158 capture 95% of the variation in the data about the mean shape 150. Accordingly, this class of shapes can be compactly represented with the mean shape 150 and the first four modes 152, 154, 156, and 158.

Before discussing specific aspects of the graph cut segmentation algorithm using a shape prior, graph theory will be discussed. In particular, an undirected graph G=<V,E> consists of vertices V and undirected edges E that connect the vertices. Each edge e∈E is assigned a non-negative cost $\omega_e$. There are two special vertices (referred to herein as "terminals") in the graph that are identified as the source s and the sink t. With the exception of the terminals s and t, the vertices are comprised of pixels P of an image to be segmented. The image to be segmented is a digital image, and can be obtained using standard digital photography, as well as medical imaging technology, such as Magnetic Resonance Imaging, ultrasound, x-ray, computed tomography, SPECT, PET, IVUS, OCT, etc. FIG. 2A illustrates an example of a graph for graph cut image segmentation. As illustrated in FIG. 2A, pixels 206 are connected by edges 208 to neighboring pixels 206, as well as the source s 202 and the sink t 204. A cut C on the graph is a partition of V into two disjoint sets S and T=V−S such that s∈S and t∈T. FIG. 2B illustrates a cut C 210 on the graph of FIG. 2A. As illustrated in FIG. 2B, each pixels 212 are connected to the source s 202, and pixels 214 are connected to the sink t 204. The pixels 212 connected to the source s 202 are considered the foreground of the image, and the pixels 214 connected to the sink t204 are considered the background of the image.

The cost of the cut is the sum of the costs of the edges that are severed by the cut, such that:

$$|C| = \sum_{e \in C} \omega_e. \quad (3)$$

In order to select a cut C, a minimum cut (i.e., the cut with the smallest cost) must be determined. There are numerous algorithms for finding the minimum, as is well known in the art.

In order to perform a graph cut image segmentation for a set of pixels P of an image, it is possible to compute a labeling f that minimizes an energy function. The labeling f labels each pixel as either foreground or background. The energy function takes the form:

$$E = \sum_{p \in P} D_p(f_p) + \sum_{p,q \in N} V_{p,q}(f_p, f_q), \quad (4)$$

where E is the energy, p and q are pixels, and N is a neighborhood formed from the vertex connectivity. Here, connectivity refers to the way edges are formed between adjacent pixels in the image. For example, in two dimensions, 4-connectivity implies forming edges between a pixel p and its neighboring pixels to the right, left, up, and down. The connectivity defines the topology of the graph. $D_p(f_p)$ is a region term that measures the cost of assigning the label $f_p$ (foreground or background) to pixel p, while $V_{p,q}$ is a boundary term that measures the cost of assigning labels $f_p, f_q$ to adjacent pixels p and q.

According to an embodiment of the present invention, both $D_p(f_p)$ and $V_{p,q}$ comprises two terms, one from image data and one from a shape constraint (shape prior) applied to the image. Given an initial shape constraint applied to the image, the mean intensity of pixels inside of the shape $\mu_i$ and the mean intensity of the pixels outside of the shape $\mu_o$ are calculated and used in the image data terms of $D_p(f_p)$ and $V_{p,q}$. Additionally, a shape mask M is generated. The shape mask M is a binary image, which is 0 inside the shape constraint and 1 outside the shape constraint. The shape mask M is used in the shape constraint terms of $D_p(f_p)$ and $V_{p,q}$.

Accordingly, the terminal weights, or region term of E, can be expressed using a Gaussian matching function by:

$$D_p(\text{foreground}) = e^{-(I(p)-\mu_i)^2/(2\sigma^2)} \lambda e^{-(M(p)-1)^2/(2\sigma^2)} \quad (5)$$

$$D_p(\text{background}) = e^{-(I(p)-\mu_o)^2/(2\sigma^2)} \lambda e^{-(M(q))^2/(2\sigma^2)}, \quad (6)$$

and the neighbor weights can be expressed using the Gaussian matching function by:

$$V_{p,q} = e^{-(I(p)-I(q))^2/(2\sigma^2)} + \lambda e^{-(M(p)-(q))^2/(2\sigma^2)} \quad (7)$$

where I is the intensity of a pixel and σ is a standard deviation of the Gaussian matching function. As expressed in Equations 5-7, the contribution of the shape term in each equation is weighted by a factor λ. This allows the strength of the shape constraint to be adjusted. For example, the larger the value of λ, the less deviation of the graph cut solution from the shape constraint.

Figure 3:
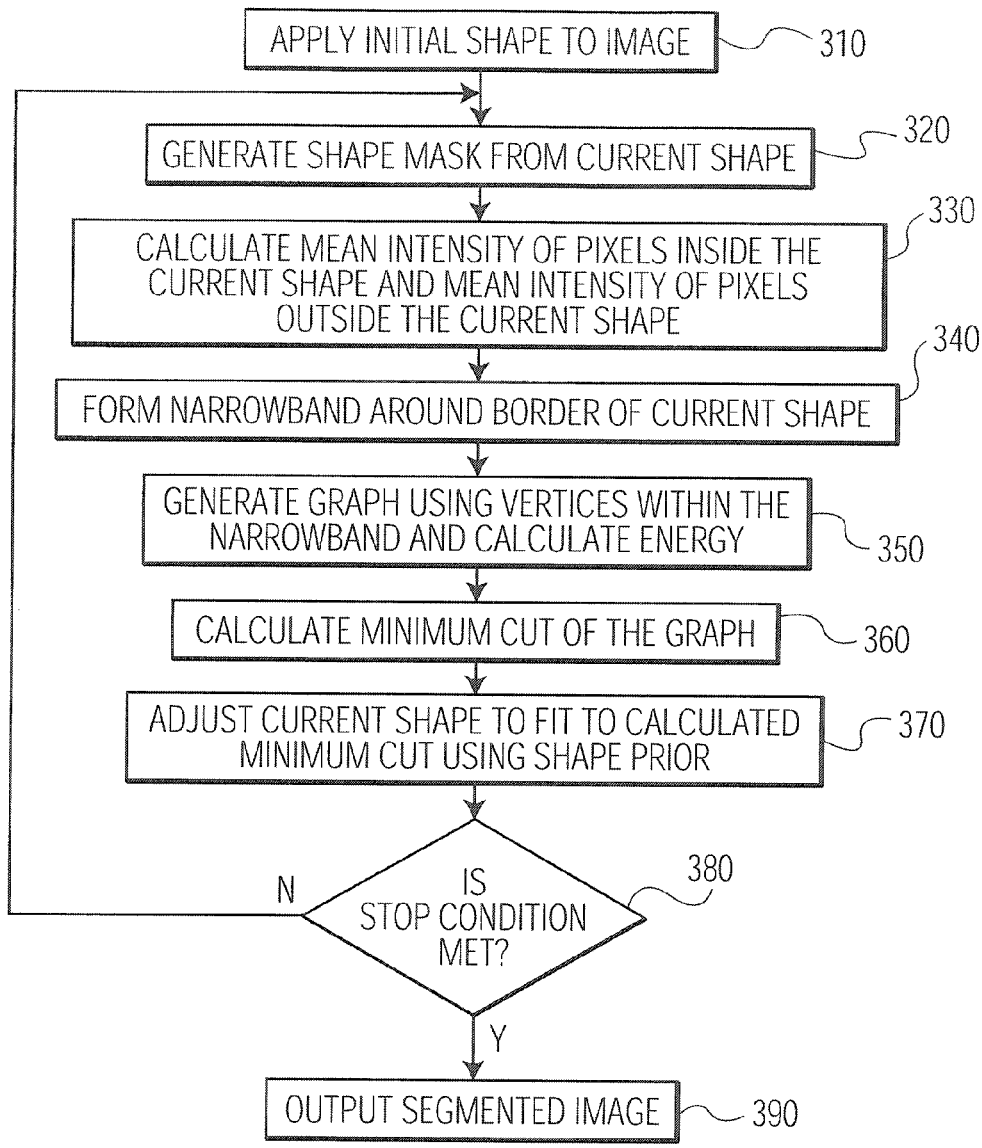
FIG. 3 is a flowchart illustrating a method for graph cut image segmentation using a shape prior according to an embodiment of the present invention.

FIG. 3 is a flowchart illustrating a method of graph cut image segmentation using a shape prior according to an embodiment of the present invention. At step 310, an initial shape is applied to an image. In this step, the method is initialized by setting a current shape prior ϵ on the image as the initial shape. The initial shape can be placed on the image automatically or through user interaction. For example, the initial shape can be automatically placed on the image at a portion of the image having the brightest intensity, or by detection of some other feature. It is also possible that a user can select a point on the image as a seed, for example by clicking on the image with a mouse. The initial shape is then formed around the seed selected by the user.

In the case of an elliptical shape prior, the initial shape may be an ellipse of a predetermined or specified size that is formed on the image around a seed point on the image (either selected by a user or determined automatically). In the case of a statistical shape prior (i.e., an eigenspace), the initial shape can be the mean shape of the eigenspace.

At step 320, a shape mask M is generated from the current shape ϵ. As described above, the shape mask M is a binary image in which pixels inside the shape ϵ are assigned the value 0 and pixels outside of the shape prior are assigned the value 1. Accordingly, for a pixel p, M(p)=0 if p is inside ϵ and M(p)=1 if p is outside ϵ.

At step 330, the mean intensity $\mu_i$ of the pixels inside the shape mask (i.e., inside the shape ϵ) as the mean intensity $\mu_o$ of the pixels outside the shape mask (i.e., outside the shape ϵ) are calculated. Although this embodiment of the present invention is described using mean intensities, the present invention is not limited thereto, and any statistical measures of the intensities of the pixels inside and outside of the shape ϵ can be used.

Figure 4:
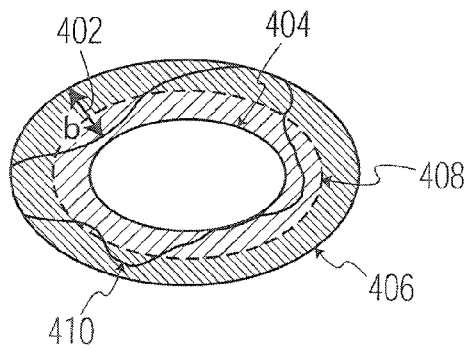
FIG. 4 illustrates a narrowband formed around a border of an exemplary shape prior according to an embodiment of the present invention.

At step 340, a narrowband is formed around a border of the current shape ϵ. FIG. 4 illustrates a narrowband 402 formed around a border 408 of an ellipse. As illustrated in FIG. 4, the narrowband 402 is a band that has a bandwidth β and is defined between an inner band boundary 404 and an outer band boundary 406, which are respectively formed on opposite sides of the border 408 of the ellipse. The narrowband 402 can be formed by dilation. For example, dilation can be achieved by performing a region growing operation using Djikstra's algorithm, or by solving the Eikonal equation using a fast marching method.

Although FIG. 4 illustrates a narrowband 402 formed using an elliptical shape prior, the present invention is not limited thereto. A narrowband can similarly be formed using a statistical shape prior or any other type of parametric shape prior.

At step 350, a graph is generated using only pixels inside the narrowband formed at step 340, and the energy for the graph is calculated. The energy is calculated based on the image intensity I, the mean intensities $\mu_i$ and $\mu_o$, and the shape mask M, as expressed in Equations 4-7. Since the graph is set up using only pixels in the narrowband, the image segmentation is locally constrained to the narrowband pixels.

At step 360, the minimum cut of the graph is calculated. As described above, the minimum cut is determined to minimize the sum of the cost of all the edges that are severed by the cut. The minimum cut also results in minimizing the energy function for the pixels included in the narrowband. As illustrated in FIG. 4, since the graph consists of only the pixels within the narrowband 402, the minimum cut C 410 will also be located within the narrowband 402.

At step 370, the current shape C is adjusted to fit to the minimum cut calculated at step 360. More particularly, a new shape is fit to the pixels within the minimum cut C using the shape prior, resulting in a new current shape $\mathfrak{C}$. At this stage, $\mathfrak{C}$ lies in the space of shapes representable by the shape prior. In the case of an elliptical shape prior, a new ellipse is fit to the minimum cut. For example, a new ellipse may be formed using a least squares algorithm that minimizes an algebraic distance between the pixels within the minimum cut C and the new ellipse. In the case of a statistical shape (i.e., a shape eigenspace), the shape of the minimum cut C is aligned to the shape eigenspace and projecting into the shape space, producing a new shape $\mathfrak{C}$ which is set to be the current shape. According to an embodiment of the present invention, the adjusted shape $\mathfrak{C}$ can be displayed at this step.

At step 380, it is determined whether a stop condition has been met. A stop condition is a condition that indicates that the image segmentation is complete. For example, in one embodiment of the present invention, the stop condition is met when the energy function of the graph converges. In this case, if the difference between a previous value of the energy function and a current value of the energy function is less than an error threshold, the energy function converges and the stop condition is met. According to another embodiment of the present invention, a predetermined number of iterations can be performed before the stop condition is met. If the stop condition has not been met at step 380, the method returns to step 320. Accordingly, the method is repeated, each time adjusting the shape prior until the stop condition is met. If the stop condition is met at step 380, the method proceeds to step 390.

At step 390, the segmented image is output. For example, the segmented image can be output by displaying the segmented image on a screen of a computer, printing the segmented image, storing the segmented image in memory of a computer, or outputting the segmented image to a software program, such as digital image editing software or medical diagnostic software. The output segmented image is segmented into a background portion and an object having the shape of the adjusted shape $\mathfrak{C}$ formed using the shape prior, as adjusted in the final iteration of step 370. In the case of the elliptical shape prior, the object is in the shape of an ellipse. In the case of the statistical shape prior, the object will have a similar shape to the training shapes that are used to define the shape eigenspace.

Figure 5D:
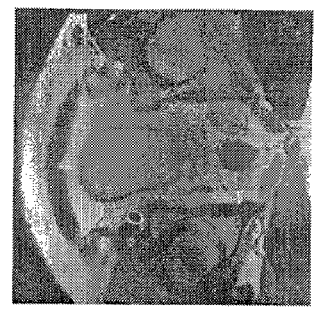
FIGS. 5A-5D illustrate segmentation results on a blood vessel in a pelvic magnetic resonance (MR) image using an elliptical shape prior according to an exemplary embodiment of the present invention.
Figure 5C:
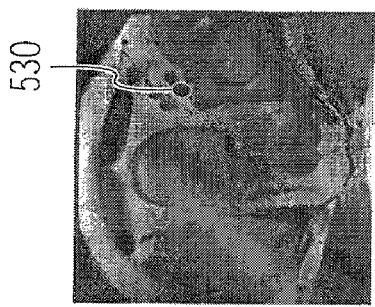
Figure 5B:
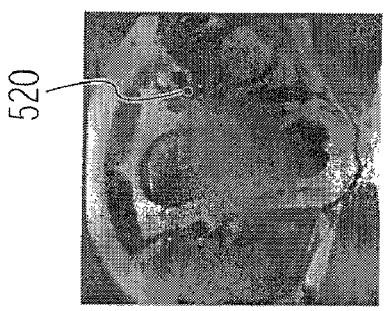
Figure 5A:
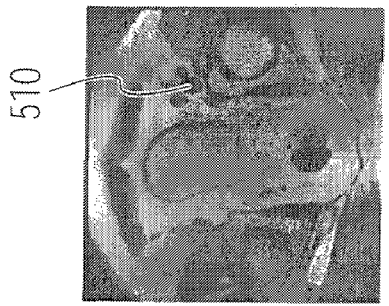

FIGS. 5A-5D illustrate an example of graph cut image segmentation using an elliptical shape prior. In FIGS. 5A-5D, the graph cut segmentation method as described above using an elliptical shape prior is used to segment a blood vessel from a pelvic magnetic resonance (MR) image. In this example, the narrowband bandwidth $\beta=7$ pixels, $\sigma$-4.5, and $\lambda=0.1$. FIG. 5A shows an initial circle 510 which is fitted around a seed point selected by a user by clicking on the image. FIG. 5B shows an intermediate result 520 after 7 iterations, and FIG. 5C shows a final converged result 530 after 20 iterations. The segmentation illustrated in FIGS. 5A-5C can be completed in less than one second on a computer with a 2.66 GHz processor. As illustrated in FIG. 5C, the shape prior constrains the solution to an elliptical region, and the method is able to accurately segment the blood vessel even though another blood vessel with a similar intensity is nearby. For comparison, FIG. 5D shows a conventional graph cut algorithm without a shape prior. As illustrated FIG. 5D, without a shape prior, the segmentation leaks through nearby dark structures and produces and undesirable result.

Figure 6A:
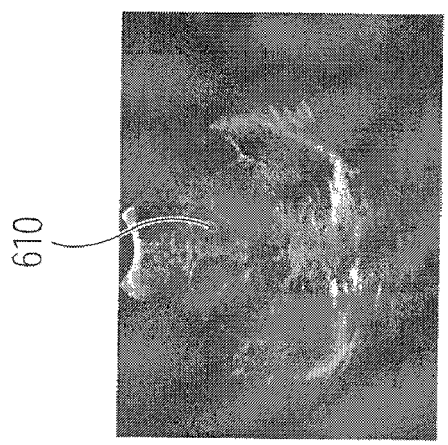
FIGS. 6A-6C illustrate segmentation results on a brain ventricle in a fetal ultrasound image using the shape eigenspace of FIG. 2B as a shape prior according to an exemplary embodiment of the present invention.
Figure 6B:
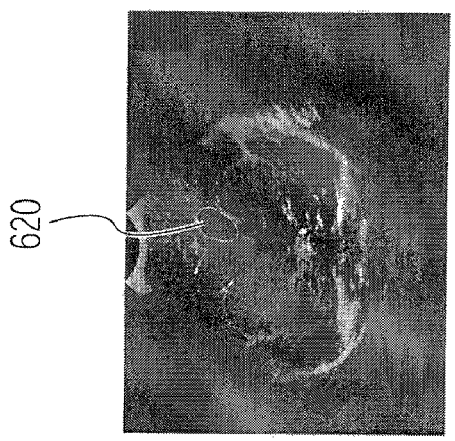
Figure 6C:
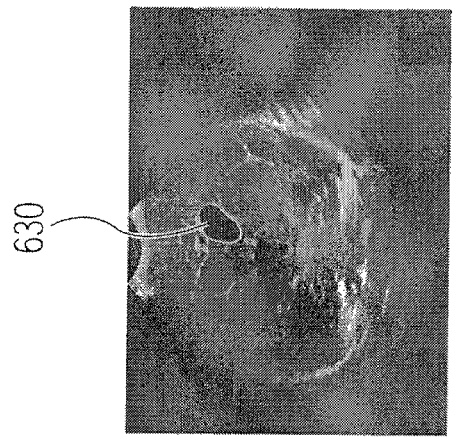

FIGS. 6A-6C illustrate an example of graph cut image segmentation using a statistical shape eigenspace. In FIGS. 6A-6C, the shape eigenspace illustrated in FIG. 2B (based on the training shapes illustrated in FIG. 2A) is used to segment a brain ventricle from a fetal ultrasound image. The analysis of ventricles is an important application for detecting hydrocephalus, which is a disease that results from the accumulation of cerebrospinal fluid in ventricles, causing them to swell. In this example, the narrowband bandwidth $\beta=10$ pixels, $\delta=4.5$, and $\lambda=0.1$. FIG. 6A illustrates the initialization of the method by placing the mean shape 610 of the shape eigenspace at the ventricle. As described above, the mean shape can be fitted around a seed point selected by a user by clicking on the image. FIG. 6B shows an intermediate result 620 after 5 iterations, and FIG. 6C shows a final converged result 630 after 10 iterations, Graph cut segmentation using a statistical shape eigenspace may take longer than using a parametric shape prior. However, the segmentation illustrated in FIGS. 6A-6C can be completed within several seconds on a computer with a 2.66 GHz processor.

The steps of the method described above have been described to give a visual understanding of the image segmentation method. It is to be understood, that the steps may be performed within a computer system using images stored within the computer system. Accordingly, some steps of the above-described method can occur as internal representations within the computer system.

Figure 7:
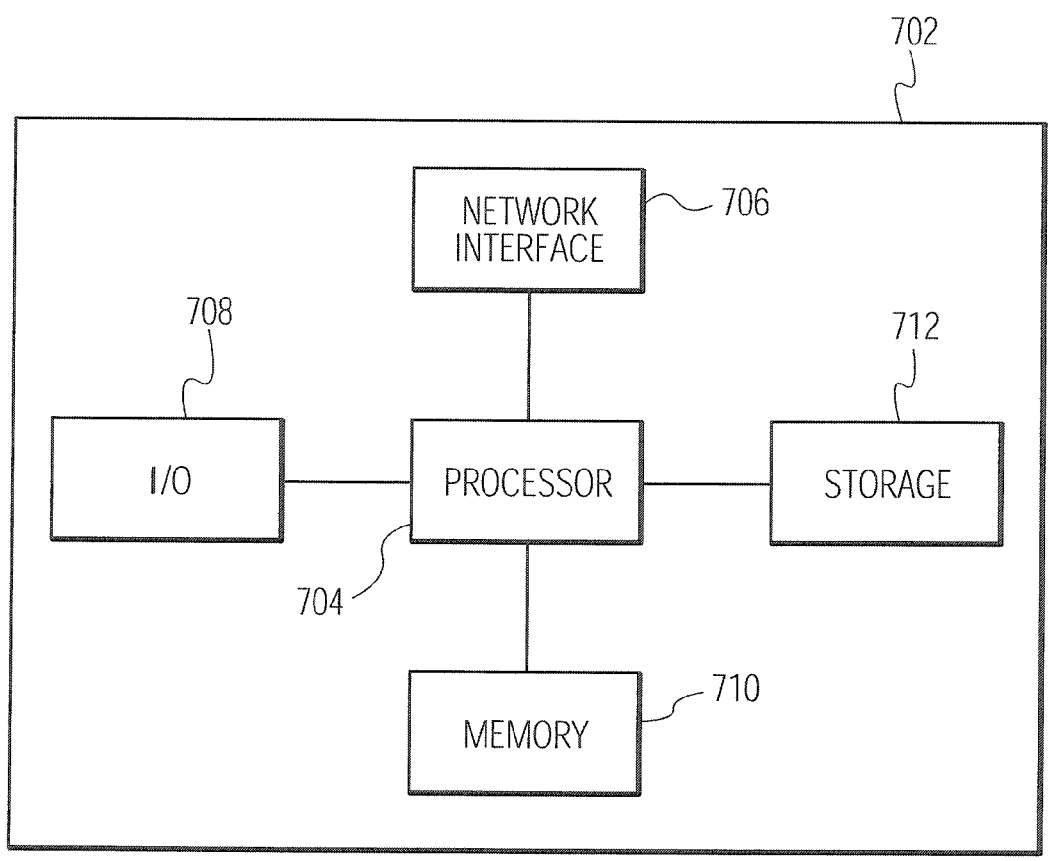
FIG. 7 illustrates a high level block diagram of a computer capable of implementing the present invention.

The graph cut image segmentation method using a shape prior can be implemented on a computer using well known computer processors, memory units, storage devices, computer software, and other components. A high level block diagram of such a computer is illustrated in FIG. 7. Computer 702 contains a processor 704 which controls the overall operation of the computer 702 by executing computer program instructions which define such operation. The computer program instructions may be stored in a storage device 712 (e.g., magnetic disk) and loaded into memory 710 when execution of the computer program instructions is desired. Thus, applications to perform image segmentation and statistical shape eigenspace calculation can be defined by the computer program instructions stored in the memory 710 and/or storage 712 and controlled by the processor 704 executing the computer program instructions. Furthermore, images to be segmented and resultant segmented images can also be stored in the memory 710 and/or the storage. The computer 702 also includes one or more network interfaces 706 for communicating with other devices via a network. The computer 702 also includes input/output 708 which represents devices which allow for user interaction with the computer 702 (e.g., display, keyboard, mouse, speakers, buttons, etc.) One skilled in the art will recognize that an implementation of an actual computer will contain other components as well, and that FIG. 7 is a high level representation of some of the components of such a computer for illustrative purposes The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for image segmentation using a shape prior, comprising the steps of:
   (a) applying an initial shape to a first portion of an image;
   (b) forming a narrowband around a border of the shape;
   (c) calculating a minimum graph cut of a second portion of the image within the narrowband;
   (d) adjusting the shape by fitting a result of the minimum graph cut using the shape prior, wherein said shape defines a segmentation result of said image; and
   (e) outputting said segmentation result of said image.

2. The method of claim 1, further comprising:
   (f) repeating steps (b)-(d) until a stop condition is met prior to step (e).

3. The method of claim 2, wherein said stop condition comprises a specified number of iterations.

4. The method of claim 2, wherein said stop condition comprises convergence of a position of the shape on the image.

5. The method of claim 2, wherein said stop condition comprises convergence of an energy function of the graph of pixels within the narrowband.

6. The method of claim 1, wherein step (a) comprises:
   selecting a seed point at said first portion of an image; and
   forming said initial shape at said seed point.

7. The method of claim 6, wherein said seed point is selected by one of a user and a computer.

8. The method of claim 6, wherein said initial shape comprises one of a parametric shape having a predetermined size and a mean shape of a statistical shape eigenspace.

9. The method of claim 1, wherein step (b) comprises:
   dilating the border of the shape in opposite directions to determine an outer narrowband boundary and an inner narrowband boundary separated by a bandwidth.

10. The method of claim 1, wherein step (c) comprises.
    generating a shape mask of the image based on the shape;
    calculating a statistical measure of a first intensity of pixels of the image inside the shape and a statistical measure of a second intensity of pixels of the image outside of the shape;
    generating a graph of pixels of the image within the narrowband;
    calculating energy of the graph based on the shape mask and the statistical measures of the first and second intensities; and
    calculating a minimum graph cut of the graph to minimize the energy of the graph.

11. The method of claim 10, wherein said statistical measure of a first intensity comprises a first mean intensity of the pixels inside the shape and said statistical measure of a second intensity comprises a second mean intensity of the pixels outside of the shape.

12. The method of claim 10, wherein said shape mask is a binary image in which pixels inside the shape have a value of 0 and pixels outside of the shape have a value of 1.

13. The method of claim 12, wherein the energy of the graph is calculated using an energy function:

$$E = \sum_{p \in P} D_p(f_p) + \sum_{p,q \in N} V_{p,q}(f_p, f_q),$$

where E is the energy, p and q are adjacent pixels, P is all of the pixels in the graph, N is a neighborhood of pixels, $f_p$ is a label that labels a pixel as one of foreground or background, $D_p(f_p)$ is a region term that measures a cost of assigning the label $f_p$ to pixel p, and $V_{p,q}$ is a boundary term that measures a cost of assigning labels $f_p, f_q$ to pixels p and q.

14. The method of claim 13, wherein the region term $D_p(f_p)$ of the energy function is expressed as:

$$D_p(\text{foreground}) = e^{-(I(p)-\mu_i)^2/(2\sigma^2)} + \lambda e^{-(M(p)-1)^2/(2\sigma^2)}$$

$$D_p(\text{background}) = e^{-(I(p)-\mu_o)^2/(2\sigma^2)} + \lambda e^{-(M(p)-0)^2/(2\sigma^2)},$$

and the boundary term $V_{p,q}$ of the energy function is expressed by:

$$V_{p,q} = e^{-(I(p)-I(q))^2/(2\sigma^2)} + \lambda e^{-(M(p)-M(q))^2/(2\sigma^2)},$$

where I represents the intensity of a pixel, M represents the shape mask, $\mu_i$ is a first mean intensity of the pixels inside the shape, $\mu_o$ is a second mean intensity of the pixels outside the shape, $\sigma$ is standard deviation of a Gaussian matching function, and $\lambda$ is a weighting parameter.

15. The method of claim 1, wherein the shape prior comprises a parametric shape.

16. The method of claim 15, wherein said parametric shape comprises an ellipse.

17. The method of claim 1, wherein said shape prior comprises a statistical shape eigenspace determined based on a plurality of training shapes.

18. The method of claim 17, wherein said statistical shape eigenspace comprises a mean shape and one or more modes.

19. A system for graph cut image segmentation using a shape prior, comprising:
    means for applying an initial shape to a first portion of an image;
    means for forming a narrowband around a border of the shape;
    means for calculating a minimum graph cut of a second portion of the image within the narrowband; and
    means for adjusting the shape by fitting a result of the minimum graph cut using the shape prior.

20. The system of claim 19, further comprising:
    means for determining whether a stop condition is met; and
    means for controlling said means for forming, means for calculating, said means for adjusting to iteratively operate until said stop condition is met.

21. The system of claim 19, wherein means for applying comprises:
   means for selecting a seed point at said first portion of an image; and
   means for forming said initial shape at said seed point.

22. The system of claim 19, wherein said means for forming comprises:
   means for dilating the border of the shape in opposite directions to determine an outer narrowband boundary and an inner narrowband boundary separated by a bandwidth.

23. The system of claim 19, wherein said means for calculating comprises:
   means for generating a shape mask of the image based on the shape;
   means for calculating statistical measures of a first intensity of pixels of the image inside the shape and of a second intensity of pixels of the image outside of the shape;
   means for generating a graph of pixels of the image within the narrowband;
   means for calculating energy of the graph based on the shape mask and the statistical measures of the first and second intensities; and
   means for calculating a minimum graph cut of the graph to minimize the energy of the graph.

24. The system of claim 19, wherein the shape prior comprises one of a parametric shape and a statistical shape eigenspace.

25. The system of claim 24, further comprising:
   means for generating said statistical shape eigenspace using one or more training shapes.

26. A computer readable medium storing computer program instructions for performing an image segmentation method using a shape prior, said computer program instructions defining the steps comprising:
   (a) applying an initial shape to a first portion of an image;
   (b) forming a narrowband around a border of the shape;
   (c) calculating a minimum graph cut of a second portion of the image within the narrowband;
   (d) adjusting the shape by fitting a result of the minimum graph cut using the shape prior, wherein said shape defines a segmentation result of said image; and
   (e) outputting said segmentation result of said image.

27. The computer readable medium of claim 26, further comprising computer program instructions defining the step of:
   (f) repeating steps (b)-(d) until a stop condition is met prior to step (e).

28. The computer readable medium of claim 26, wherein the computer program instructions defining step (a) comprise computer program instructions defining the steps of:
   selecting a seed point at said first portion of an image; and
   forming said initial shape at said seed point.

29. The computer readable medium of claim 26, wherein the computer program instructions defining step (b) comprise computer program instructions defining the step of:
   dilating the border of the shape in opposite directions to determine an outer narrowband boundary and an inner narrowband boundary separated by a bandwidth.

30. The computer readable medium of claim 26, wherein the computer program instructions defining step (c) comprise computer program instructions defining the steps of:
   generating a shape mask of the image based on the shape;
   calculating statistical measures of a first intensity of pixels of the image inside the shape and a second intensity of pixels of the image outside of the shape;
   generating a graph of pixels of the image within the narrowband;
   calculating energy of the graph based on the shape mask and the statistical measures of the first and second intensities; and
   calculating a minimum graph cut of the graph to minimize the energy of the graph.

31. The computer readable medium of claim 26, wherein the shape prior comprises one of a parametric shape and a statistical shape eigenspace.

* * * * *